June 8, 1971  L. CEOLIN  3,583,059
METHOD OF MANUFACTURING A FIGURINE
Filed June 9, 1969
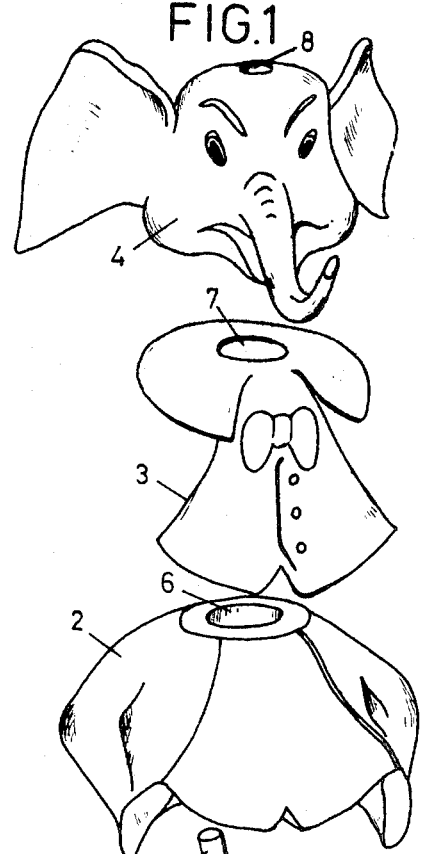
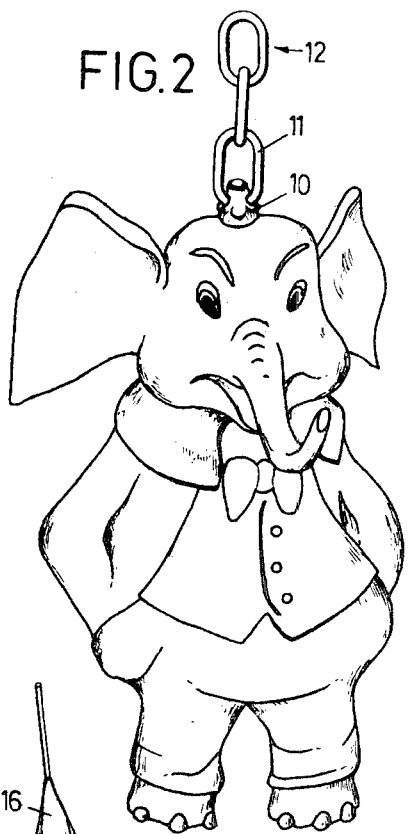
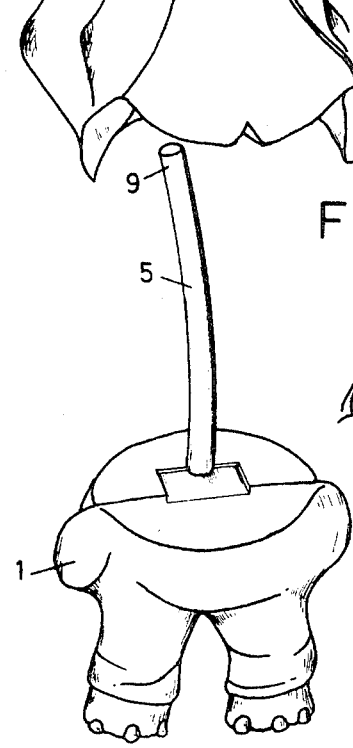
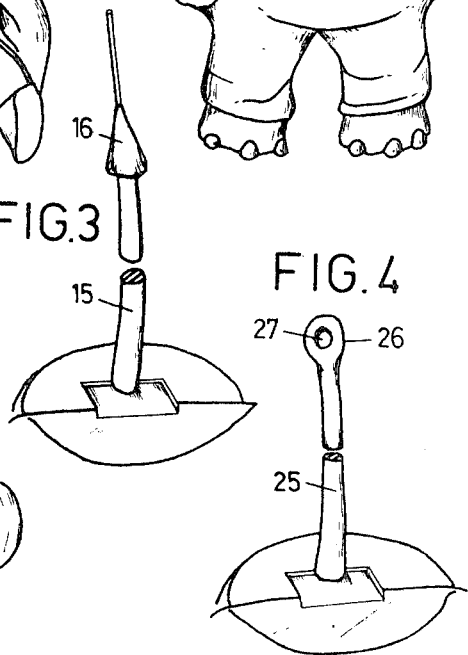

United States Patent Office 3,583,059
Patented June 8, 1971

3,583,059
METHOD OF MANUFACTURING A FIGURINE
Luigi Ceolin, Pordenone, Italy, assignor to N.V. Xandria, Haarlem, Netherlands
Filed June 9, 1969, Ser. No. 831,411
Int. Cl. B23p *11/00, 11/02*
U.S. Cl. 29—444                     8 Claims

ABSTRACT OF THE DISCLOSURE

A method of making a figurine comprises forming a plurality of abutting parts which are capable of being moved relative to each other from deformable material, forming one of the parts integrally with a stem connected with an abutting face and forming each of the other of the parts with an aperture therethrough which, in each part to be connected between two other parts, extends from abutting face to abutting face and in each end part from the abutting face to one of the other boundary surfaces of this end part. The length of the stem exceeds the total length of the apertures of the parts to be connected to the end part on the side of the stem. The figurine is assembled by inserting the stem successively through the apertured parts in the desired sequence, and forming the end of the stem projecting from the end part with an enlargement.

---

The present invention relates to a method of composing a figurine, known in the art as a pixy, representing a human, animal, or fancy figure, and consisting of a plurality of abutting parts capable of moving relative to each other, so that these parts can be adjusted with respect to one another.

More particularly, the present invention relates to a method of making small size figurines from a synthetic material by injection molding, for advertising and other purposes, for example as a free gift given to buyers of specific wares. These figurines serve the purpose of being used as toys by children of these buyers.

It is an object of this invention to provide a method of manufacture of a figurine of the type described above, which is simple and low in cost.

In manufacturing figurines of the type referred to above, wherein the various parts are adjustable relative to each other, the cost of securing these parts plays an important part in the total manufacturing cost. To keep this cost as low as possible, one of the parts, in accordance with this invention, is formed integrally with a stem connected with an abutting face and the other parts are each formed with an aperture therethrough which, in each part to be connected between two other parts, runs from abutting face to abutting face and in each end part from the abutting face to one of the other boundary surfaces of said end part, the stem being longer than the total length of the apertures of the parts to be put on that stem, the figurine being assembled by inserting the stem successively through the apertured parts in the desired sequence, the end of the stem projecting from the end part being thickened so as to secure the end part with respect to outward axial movement on the stem.

The invention will now be further illustrated with reference to the accompanying drawings, in which:

FIG. 1 is an exploded view of the figurine;
FIG. 2 shows an assemble figurine;
FIG. 3 is an illustrative view of an alternative embodiment of the stem; and
FIG. 4 is an illustrative view of still another embodiment of the stem.

Referring to FIGS. 1 and 2, the figurine represents a fancy figure from a children's story, consisting of a trouser-portion 1, a trunk 2 and shoulder portions 3, and a head 4. These parts may be made from such material as soft polyvinylchloride by injection molding.

The trouser portion 2 is provided with a stem 5, the other parts being formed with apertures 6, 7, 8 therethrough. The length of the stem 5 is greater than the total length of the apertures 6, 7, 8 of parts 2, 3, 4 to be put on that stem. For the assembly, the stem 5 is inserted through the apertures 6, 7, 8 of the parts 2, 3, 4 in their desired sequence. Subsequently the projecting part 9 of the stem 5 is deformed, for example by means of a heat treatment to form a knob 10 or a flat, through enlarged portion (not shown), so that the end part 4 is fixed axially with respect to the stem. Finally the end of the stem may be secured to a link 11 of a chain 12 with a key-ring or the like (not shown).

FIG. 3 shows an alternative embodiment of the stem 15, wherein the latter is provided with a barb 16 of such dimensions as to be flexible enough to be inserted and pulled through the apertures. As it emerges from the last aperture, the barbed portion 16 will resiliently re-assume its initial shape and prevent the parts from sliding off the stem.

FIG. 4 shows a further alternative embodiment of the stem 25, wherein the latter is made from a flexible material and the end of the stem, which in the assembled state of the figurine will just project from the end part, has an eye portion 26. Because of its flexibility, the eye portion 26 can be pulled through the apertures, whereupon a rigid pin, forming part of, for example, a chain of a key-ring, can be inserted through the opening 27 of the eye portion 26. The diameter of the eye cannot then be reduced any longer, so that once again the end part is axially fixed relative to the stem.

It will be understood that the present invention is not limited to the embodiments described above and shown in the drawings. Thus, instead of the end part, such as the trouser portion, a center portion of the figurine can be provided with a stem at either end thereof. The lower parts of the figurine can then be put on the lower stem and the upper parts on the upper stem, whereafter the parts of the stem projecting from the end parts of the figurine are provided with any one of the fixing means of the type described above.

I claim:

1. A method of making a figurine from deformable material, representing a human, animal, or fancy figure, and consisting of a plurality of abutting parts capable of moving relative to each other, which method comprises forming one of said parts integrally with a steam connected with an abutting face and forming each of the other parts with an aperture therethrough which, in each part to be connected between two other parts, runs from abutting face to abutting face and in each end part from the abutting face to one of the other boundary surfaces of said end part, inserting the stem through the apertures of the other parts, the stem being longer than the total length of the apertures of the parts assembled on that stem, the figurine being assembled by inserting the stem successively through the apertured parts in the desired sequence, and enlarging the end of the stem projecting from the last end part to fix such end part with respect to outward axial movement on the stem.

2. A method as claimed in claim 1, wherein the part provided with the stem is made from heat deformable material and the end of the stem projecting from the end part is enlarged by forming a flat, though enlarged portion of the stem by means of heat deformation.

3. A method as claimed in claim 1, wherein the part provided with the steam is made from heat deformable material and the end of the stem projecting from the end part is enlarged by forming a lumpy portion by means of heat deformation.

4. A method as claimed in claim 3, wherein the part provided with the stem is made from heat deformable material and said lumpy portion is formed with an aperture therein by which a link of a chain can be inserted.

5. A method as claimed in claim 1, wherein the part provided with the stem is made from flexible material and the end of the stem projecting from the end part is enlarged by making a knot in said end.

6. A method as claimed in claim 1, wherein the part provided with the stem is made from flexible material and each stem, at a distance from its initial point equal to the total length of the aperture of the parts to be put on that stem, is formed with an eye portion integral therewith, and inserting a rigid pin through the eye of said eye portion to fix the individual parts on the stem.

7. A method as claimed in claim 1, wherein the part provided with the stem is made from flexible material, and each stem at a distance from its initial point equal to the total length of the apertures of the parts to be put on that stem, is formed with an eye portion integral therewith, inserting a rigid pin through the eye of said eye portion to fix the individual parts on the stem, and forming said pin as part of a link of a chain with a key-ring.

8. A method as claimed in claim 1, wherein the part provided with the stem is made from flexible material and the stem, at a distance from its initial point substantially equal to the total length of the apertures of the parts to be put on that stem, is formed with said enlarged portion which, in axial section, is formed with the shape of a barb with its point extending in the direction of the free end of the stem, the largest width of said barb being larger than the diameter of the aperture of the last end part, the individual parts of the figurine being assembled by forcing the stem through the said apertures so as to cause the diameter of the barb to be flexibly reduced and to cause the barb to pass through the apertures, and subsequently pulling the barb out of the last end part to permit the barb to re-assume its initial diameter so as to fix the last end part, axially with respect to the stem.

References Cited

UNITED STATES PATENTS

| | | | |
|---|---|---|---|
| 2,060,394 | 11/1936 | Hiering | 29—444 |
| 3,479,727 | 11/1969 | Colautti et al. | 29—444 |

THOMAS H. EAGER, Primary

U.S. Cl. XR

29—453; 46—22